United States Patent
Kang

(10) Patent No.: US 10,078,161 B2
(45) Date of Patent: Sep. 18, 2018

(54) OPTICAL FILM AND DIGITAL PEN SYSTEM USING THE SAME

(71) Applicant: PEN Generations Inc., Seongnam-si Gyeonggi-do (KR)

(72) Inventor: Yong Hoon Kang, Seoul (KR)

(73) Assignee: PEN Generations Inc., Seongnam-si (KR)

( * ) Notice: Subject to any disclaimer, the term of this patent is extended or adjusted under 35 U.S.C. 154(b) by 557 days.

(21) Appl. No.: 14/418,082

(22) PCT Filed: Feb. 4, 2013

(86) PCT No.: PCT/KR2013/000878
§ 371 (c)(1),
(2) Date: Jan. 29, 2015

(87) PCT Pub. No.: WO2014/021527
PCT Pub. Date: Feb. 6, 2014

(65) Prior Publication Data
US 2015/0198751 A1  Jul. 16, 2015

(30) Foreign Application Priority Data

Jul. 30, 2012  (KR) .......... 10-2012-0083174

(51) Int. Cl.
| | | |
|---|---|---|
| *G02B 5/02* | (2006.01) | |
| *G02B 5/20* | (2006.01) | |
| *G06F 3/0354* | (2013.01) | |
| *G02B 5/08* | (2006.01) | |

(52) U.S. Cl.
CPC .......... *G02B 5/0205* (2013.01); *G02B 5/021* (2013.01); *G02B 5/08* (2013.01); *G02B 5/208* (2013.01); *G06F 3/03545* (2013.01)

(58) Field of Classification Search
CPC .......... G02B 5/02; G02B 5/0205; G02B 5/20; G02B 5/208; G02B 5/08; G02B 5/285; G02B 1/115; G02B 5/021; G06F 3/03545; G06F 3/0488; G06F 3/0421; H01L 31/0232; H01L 31/0236; H01L 31/18
USPC ........ 359/359, 586, 588, 589; 235/494, 454, 235/472.01–472.03; 345/173, 175
See application file for complete search history.

(56) References Cited

U.S. PATENT DOCUMENTS

2011/0109641 A1 * 5/2011 Yoshida ................ G06F 3/0321
345/589

FOREIGN PATENT DOCUMENTS

| JP | 2002-5351714 | 10/2002 |
|---|---|---|
| JP | 2005-215676 | 8/2005 |
| JP | 2007-010893 | 1/2007 |

(Continued)

OTHER PUBLICATIONS

Notice of Reasons for Refusal dated Oct. 26, 2016 From the Japan Patent Office Re. Application No. 2015-525314 and Its Brief Report Into English. (6 Pages).

(Continued)

*Primary Examiner* — Jie Lei

(57) ABSTRACT

An optical film and a digital pen system using the same are provided. The optical film includes a film layer including a fine structure, a coating layer coated on the fine structure and having an infrared ray scattering property, and a matching layer laminated above or below the film layer and having a refractive index matching a refractive index of the fine structure within a predetermined error range.

6 Claims, 4 Drawing Sheets

(56) References Cited

FOREIGN PATENT DOCUMENTS

| | | |
|---|---|---|
| JP | 2008-243154 | 10/2008 |
| JP | 2009-043218 | 2/2009 |
| JP | 2010-085532 | 4/2010 |
| JP | 2011-224964 | 11/2011 |
| KR | 10-20080038328 | 5/2008 |
| KR | 1020100052526 | 5/2010 |
| WO | WO 00/43813 | 7/2000 |
| WO | WO 2012/038592 | 3/2012 |
| WO | WO 2014/021527 | 2/2014 |

OTHER PUBLICATIONS

Supplementary European Search Report and the European Search Opinion dated Feb. 8, 2016 From the European Patent Office Re. Application No. 13825651.6.
International Search Report dated May 15, 2013 From the International Searching Authority Re. Application No. PCT/KR2013/000878.

* cited by examiner

[Fig. 1]
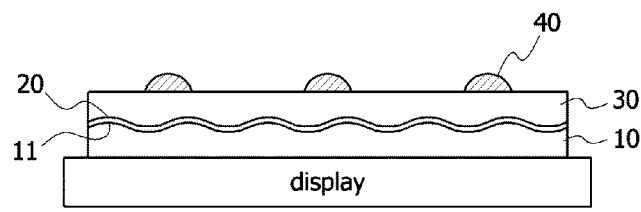
[Fig. 2]
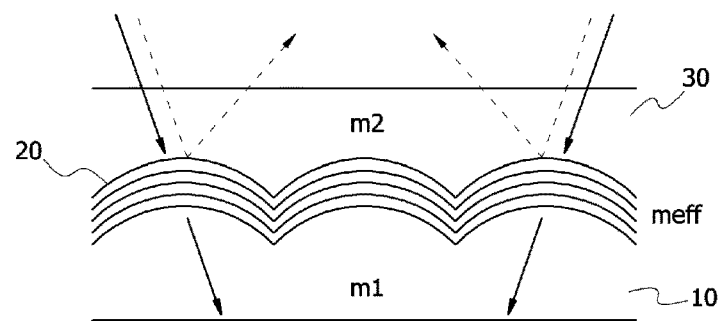
[Fig. 3]
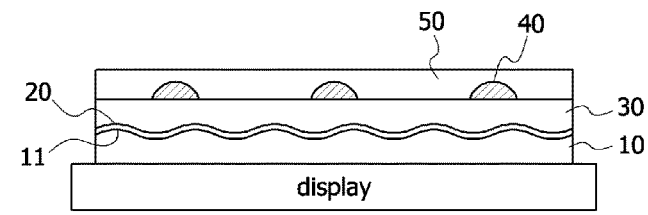
[Fig. 4]
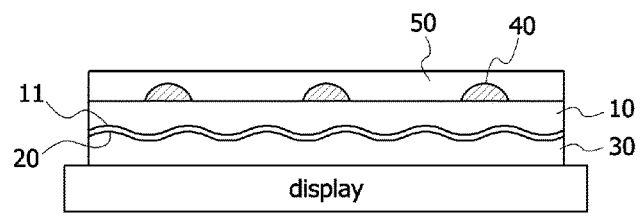
[Fig. 5]
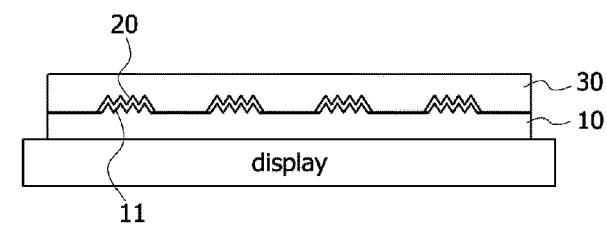

[Fig. 6]
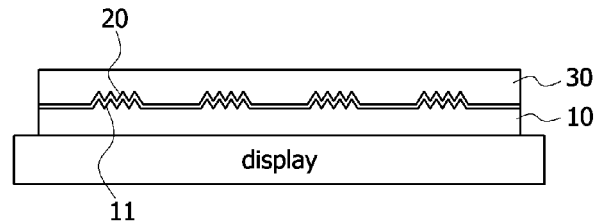
[Fig. 7]
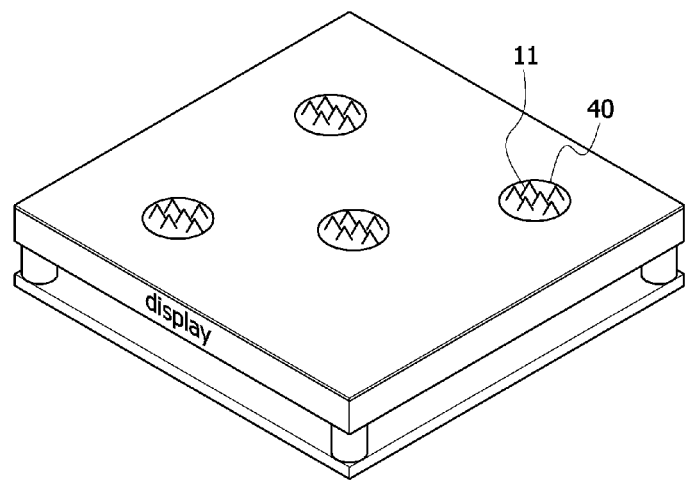
[Fig. 8]
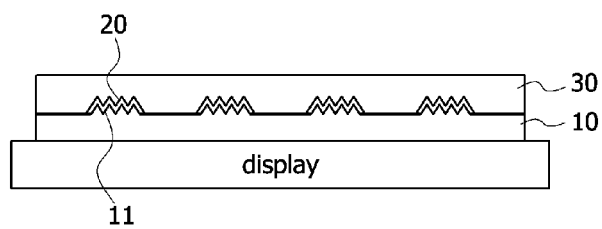
[Fig. 9]
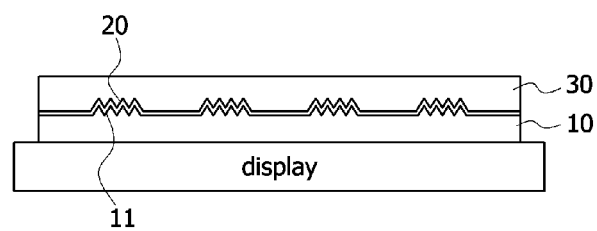

[Fig. 10]
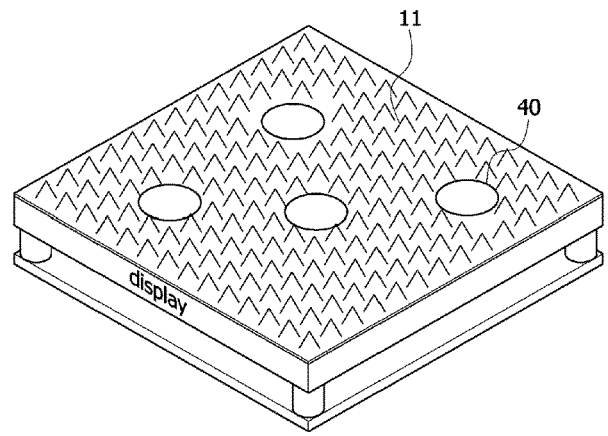
[Fig. 11]
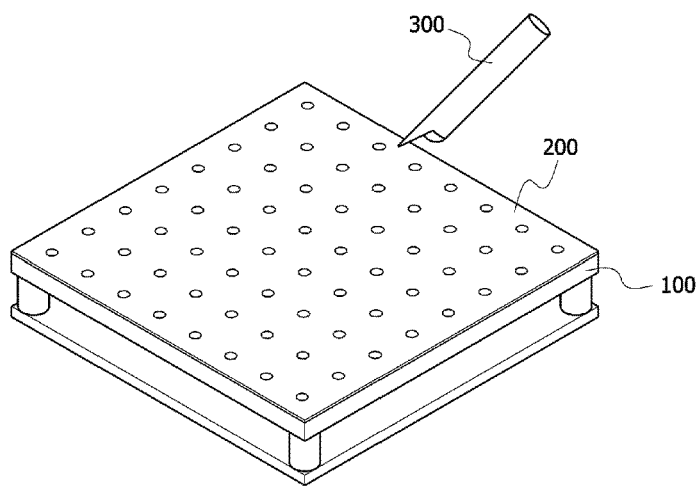
[Fig. 12]
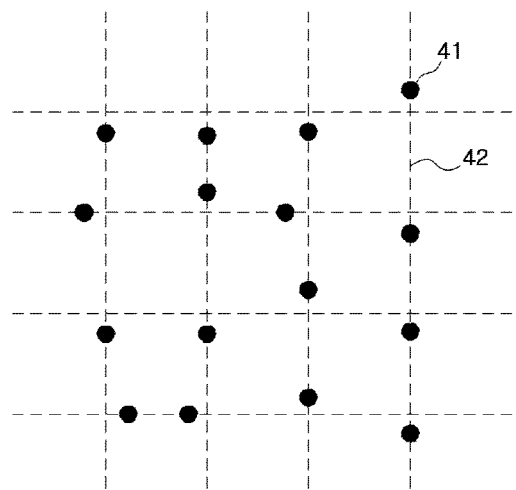

[Fig. 13]
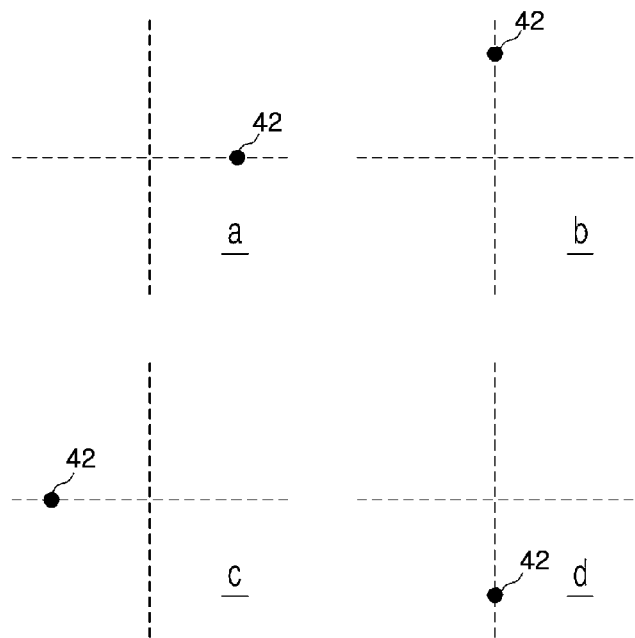

OPTICAL FILM AND DIGITAL PEN SYSTEM USING THE SAME

CROSS-REFERENCE TO RELATED APPLICATIONS

This application is a National Phase of PCT Patent Application No. PCT/KR2013/000878 having International filing date of Feb. 4, 2013, which claims the benefit of priority of Korean Patent Application No. 10-2012-0083174 filed on Jul. 30, 2012. The contents of the above applications are all incorporated by reference as if fully set forth herein in their entirety.

BACKGROUND

1. Field of the Invention

The present invention relates to an optical film and a digital pen system using the same, and more particularly, to a high-luminance optical film attached on a display and a digital pen system providing positional information using the same.

2. Discussion of Related Art

A digital pen system is a pen of a new concept in which analog and digital methods are combined. When characters are written on a paper as is done by a general pen, the written content is stored in a memory built in the digital pen, which is then transferred in the form of an image file to a computer for management. Although documents written by the general pen can also be scanned by a scanner (electronic color analysis machine) and stored in the form of the image file, the digital pen has advantages in that the documents written by the digital pen do not need to be scanned and can be easily managed using a separate program. The digital pen developed in an early stage could be used only when it was connected to a computer. In other words, in order to use the digital pen, the computer should always be turned on and the digital pen should be used only near the computer. In addition, in a case of storing the content in the computer, the resolution of the image file was poor so that the content could not be exactly recognized.

In recent years, a high-performance digital pen in which the written content can be stored in the memory built in the digital pen and converted to digital data at any time when it is connected to a computer has also been released. Further, not only digital pens in which liquid crystal displays are built and the content being written is allowed to be directly checked on screens but also digital pens that can wirelessly transfer data without being connected to a cable have been developed, and touch-screen schemes that allow positional information of the digital pen on the display to be sensed or techniques that allow moving trajectories of the digital pen to be sensed using an externally mounted sensor have been employed.

In order to use the digital pen, a transparent film in which dot patterns are implemented should have a property for scattering infrared rays. However, since the transparent film scatters visible rays as well as infrared rays, it has a problem in that an image is distorted and the visibility is deteriorated to cause a display to be dim when the transparent film is attached on the display.

A technique for sensing touch positions of the digital pen and displaying graphical information at the sensed positions using an infrared ray sensor mounted on the digital pen is disclosed in various documents including Korean Patent Publication No. 10-2010-0134331. However, according to the disclosed document mentioned above, an optical film is formed of a material that can reflect infrared and visible rays so that the digital pen can recognize marks on the optical film. When this optical film is attached to the display, there arises a problem in that the definition and the visibility of the overall image are deteriorated.

SUMMARY OF THE INVENTION

The present invention is directed to an optical film that is attached to a display on which a digital pen is used and maintains a property for scattering infrared rays while transmitting visible rays to minimize an effect on a displaying function of the display, and a digital pen system using the same.

According to an aspect of the present invention, there is provided an optical film, including: a film layer including a fine structure; a coating layer coated on the fine structure and having an infrared ray scattering property; and a matching layer laminated above or below the film layer and having a refractive index matching a refractive index of the film layer within a predetermined error range.

The coating layer may be formed by cross-laminating at least two material layers having different refractive indexes from each other, and the refractive index of the coating layer may be determined by the refractive indexes of the at least two material layers.

The coating layer may be configured to include a material that reflects infrared rays with a wavelength of 800 nm to 1,500 nm.

Each one surface of the matching layer and the film layer may be in contact with each other, and at least one other surface of the matching layer and the film layer may be applied with a pressure-sensitive adhesive.

Dot patterns for absorbing the infrared rays may be printed on the film layer or the matching layer.

The optical film may further include a protection coating layer formed on the dot patterns and acting to protect the dot patterns.

The optical film may further include a dot pattern layer laminated on the fine structure and having dot patterns printed on the dot pattern layer.

The optical film may further include a protection coating layer formed on the dot pattern layer and acting to protect the dot patterns.

The fine structure may have any one of a semi-sphere shape, an inverted semi-sphere shape, a prism shape, and a triangular pyramid shape.

The fine structure may be partially formed along dot patterns.

The coating layer may be partially formed along the fine structure.

The fine structure may be formed in a portion in which marks of dot patterns are not formed.

The coating layer may be partially formed along the fine structure.

According to another aspect of the present invention, there is provided a digital pen system, including: a display; an optical film disposed on the display, and including a film layer having a fine structure, a coating layer coated on the fine structure and having an infrared ray scattering property, and a matching layer laminated above or below the film layer and having a refractive index matching a refractive index of the film layer within a predetermined error range, and the optical film having dot patterns for absorbing infrared rays printed on the fine structure or the matching layer; and a digital pen that recognizes the dot patterns and transmits signals for displaying graphical information on the display.

According to the optical film and the digital pen system using the same, since the optical film is attached to the display on which the digital pen is used and maintains the property for scattering infrared rays while transmitting visible rays, an effect on the displaying function of the display can be minimized.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 1 is a configuration diagram illustrating an optical film in accordance with an embodiment of the present invention;

FIG. 2 is a schematic diagram illustrating refractive index matching in accordance with an embodiment of the present invention;

FIG. 3 is a configuration diagram illustrating an optical film in accordance with another embodiment of the present invention;

FIG. 4 is a configuration diagram illustrating an optical film in accordance with still another embodiment of the present invention;

FIG. 5 is a configuration diagram illustrating an optical film in accordance with yet another embodiment of the present invention;

FIG. 6 is a configuration diagram illustrating an optical film in accordance with still yet another embodiment of the present invention;

FIG. 7 is a perspective diagram illustrating an optical film in accordance with still yet another embodiment of the present invention;

FIG. 8 is a configuration diagram illustrating an optical film in accordance with still yet another embodiment of the present invention;

FIG. 9 is a configuration diagram illustrating an optical film in accordance with still yet another embodiment of the present invention;

FIG. 10 is a perspective diagram illustrating an optical film in accordance with still yet another embodiment of the present invention;

FIG. 11 is a conceptual diagram illustrating a digital pen system in accordance with an embodiment of the present invention;

FIG. 12 is a diagram illustrating dot patterns in accordance with an embodiment of the present invention; and FIG. 13 is a schematic diagram illustrating dot patterns in accordance with an embodiment of the present invention.

DETAILED DESCRIPTION OF EXEMPLARY EMBODIMENTS

Various modifications and embodiments can be made in the present invention, and reference will be made in detail to the preferred embodiments of the present invention, examples of which are illustrated in the accompanying drawings. It should be understood, however, that there is no intent to limit the present invention to the particular example embodiments disclosed and example embodiments are to cover all modifications, equivalents, and alternatives falling within the spirit and technical range of the invention.

Although terms including ordinal numbers such as a first, a second, etc, may be used to explain various components, the components are not limited to the terms. The terms are used only for the purpose of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

It will be understood that when a component is referred to as being "on" or "connected to" another component, it can be directly on or directly connected to the other component, or intervening components may be present therebetween. In contrast, when a component is referred to as being "directly on" or "directly connected to" another component, there are no intervening components present.

Terms used herein are provided for explaining embodiments of the present invention, not limiting the invention. As used herein, the singular forms "a," "an," and "the" are intended to include the plural forms as well, unless the context clearly indicates otherwise. It will be understood that the terms "comprises" and/or "having," when used in this specification, specify the presence of stated features, integers, steps, operations, elements, components, or combinations thereof, but do not preclude the presence or addition of one or more other features, integers, steps, operations, elements, components, or combinations thereof.

Unless otherwise defined herein, all terms used in the present invention including technical or scientific terms have the same meanings as terms that are generally understood by those skilled in the art related to the field of the present invention. The same terms as those of which are defined in a general dictionary should be understood that the terms have the same meanings as those generally understood by those skilled in the art. The same terms as those that are defined in a general dictionary should be understood that the terms have the same meanings as contextual meanings of the related art. And, unless the terms are definitely defined in the present invention, the terms are not interpreted as ideal or excessively formal meanings.

Hereinafter, embodiments will be described in detail with reference to accompanying drawings, and the same or corresponding components will be denoted with the same reference numerals with regard to the drawing numbers, and the repeated explanation thereof is omitted.

FIG. 1 is a configuration diagram illustrating an optical film in accordance with an embodiment of the present invention.

Referring to FIG. 1, the optical film according to an embodiment of the present invention may be configured to include a film layer 10 having a fine structure 11 on an upper surface of the film layer, a coating layer 20 formed on the upper surface of the film layer 10 and having an infrared ray scattering property, a matching layer 30 laminated above the film layer 10 and having a refractive index matching that of the film layer 10 within a predetermined error range, and dot patterns 40 formed above the matching layer 30.

First, the film layer 10 may be formed of a transparent material that transmits rays incident on the optical film. For example, the film layer 10 may be formed of at least one material selected from the group consisting of glass, polyethylene terephthalate (PET), polycarbonate (PC), polyethylene naphthalate (PEN), co-PEN, polystyrene (PS), polymethyl methacrylate (PMMA), polybutylene terephthalate (PBT), polypropylene (PP), polyethylene (PE), and so forth.

The fine structure 11 may be formed on the upper surface of the film layer 10. The fine structure 11 may be formed by structuring the upper surface of the film layer 10 or using a pressure-sensitive adhesive to laminate a separate structure such as a glass bead on the upper surface of the film layer 10. The fine structure 11 may be shaped to have any one of a semi-sphere shape, an inverted semi-sphere shape, a prism shape, and a triangular pyramid shape, or a similar shape. The fine structure 11 may be formed to have a light-directing property. For example, the light-directing property of the fine structure 11 may include rotation, dispersion, refraction, or reflection.

The coating layer 20 having the same shape as that of the fine structure 11 may be formed on the fine structure 11. The coating layer 20 may be formed by cross-laminating transparent dielectric film regions to have an infrared ray reflecting function.

The transparent dielectric film may be formed of a material including at least one of oxides of zinc, tin, indium, bismuth, titanium, hafnium, and zirconium, alloys thereof, silicon nitride, and silicon oxynitride.

The coating layer 20 has the property that reflects or scatters the infrared rays of 800 nm to 1500 nm at a high ratio but transmits the visible rays because of the cross-lamination of the transparent dielectric film regions.

The refractive index of the film layer 10 forming the fine structure 11 and the refractive index of the matching layer 30 to be described hereinafter may be matched within a predetermined error range. Referring to FIG. 2, when the refractive index of the film layer 10 forming the fine structure 11 is $n_1$ and the refractive index of the matching layer 30 is $n_2$, $n_1$ and $n_2$ have the same or similar value within a predetermined error range.

In other words, since the visible rays with $n_1 \approx n_2$ incident on the optical film penetrate the matching layer 30 and the film layer 10 as is done in the materials having the same refractive index, the scattering rate of the visible rays on the surface can be minimized. However, the infrared rays incident on the optical film along with the visible rays are reflected and scattered because of the shape characteristics of the fine structure 11 and the coating layer 20, so that the distortion of the display image can be minimized and the visibility can be enhanced while a function for recognizing the pattern of the digital pen can be provided.

The matching layer 30 is laminated above the film layer 10 on which the fine structure 11 is formed, and has the same refractive index as that of the film layer 10 forming the fine structure 11 within a predetermined error range. The matching layer 30 may be formed of at least one material selected from the group consisting of glass, PET, PC, PEN, co-PEN, PS, PMMA, PBT, PP, PE, and so forth.

One surface of the film layer 10 on which the fine structure 11 is formed may be in direct contact with the matching layer 30 and the other surface thereof may be applied with a pressure-sensitive adhesive. The pressure-sensitive adhesive may be formed of a silicon or acrylic-based pressure-sensitive adhesive composition and may be applied to the other surface of the film layer 10 on which the fine structure 11 is formed. However, the pressure-sensitive adhesive may also be formed to be integral with some material for forming the film layer 10 on which the fine structure 11 is formed. In addition, the pressure-sensitive adhesive may be in the form of a film of which both surfaces are applied with an adhesive to facilitate that the optical film is attached to the display.

The dot patterns 40 may be formed above the matching layer 30, and may be formed of an ink material that has a high transmittance of visible rays and can selectively absorb the infrared rays, or may be formed with a concentration that can minimize the effect on the display image while absorbing the infrared and visible rays. The infrared region is approximately in a range of 700 nm to 10,000 nm and may be divided into a near infrared region, a middle infrared region, and a far infrared region. The dot patterns 40 can absorb the near infrared region of about 750 nm to 1,300 nm.

For example, the dot patterns 40 may be formed by mixing a phthalocyanine-based compound, a naphthalocyanine-based compound, an aminium-based compound, or the like that has an infrared ray absorbing property with a resin having an infrared ray curable property and a hardener to generate a resin compound, and printing the resin compound onto the film layer 10 formed of the transparent material or the matching layer 30 described above.

In addition, the dot patterns 40 may be laminated above the matching layer 30 in the form of a dot pattern 40 layer, and the composition material and function thereof are already described.

FIG. 3 is a configuration diagram illustrating an optical film in accordance with another embodiment of the present invention. The optical film according to another embodiment of the present invention includes a film layer 10 having a fine structure 11 on an upper surface of the film layer, a coating layer 20 formed on the upper surface of the film layer 10 and having an infrared ray scattering property, a matching layer 30 laminated above the film layer 10 and having a refractive index matching that of the film layer 10 on which the fine structure 11 is formed within a predetermined error range, dot patterns 40 formed above the matching layer 30, and a protection coating layer 50 for protecting the dot patterns 40.

The film layer 10 may be formed of a transparent material that transmits rays incident on the optical film. For example, the film layer 10 may be formed of at least one material selected from the group consisting of glass, PET, PC, PEN, co-PEN, PS, PMMA, PBT, PP, PE, and so forth.

The fine structure 11 may be formed on the upper surface of the film layer 10. The fine structure 11 may be formed by structuring the upper surface of the film layer 10 or using a pressure-sensitive adhesive to laminate a separate structure such as a glass bead on the upper surface of the film layer 10. The fine structure 11 may be shaped to have any one of a semi-sphere type, an inverted semi-sphere type, a prism shape, and a triangular pyramid shape, or a similar type. The fine structure 11 may be formed to have a light-directing property. For example, the light-directing property of the fine structure 11 may include rotation, dispersion, refraction, or reflection.

The coating layer 20 having the same shape as that of the fine structure 11 may be formed on the fine structure 11. The coating layer 20 may be formed by cross-laminating transparent dielectric film regions to have an infrared ray reflecting function.

The transparent dielectric film may be formed of a material including at least one of oxides of zinc, tin, indium, bismuth, titanium, hafnium, and zirconium, alloys thereof, silicon nitride, and silicon oxynitride.

The coating layer 20 has the property that reflects or scatters the infrared rays of 800 nm to 1500 nm at a high ratio but transmits the visible rays because of the cross-lamination of the transparent dielectric film regions.

The refractive index of the film layer 10 forming the fine structure 11 and the refractive index of the matching layer 30 to be described hereinafter may be matched within a predetermined error range. Referring to FIG. 2, when the refractive index of the film layer 10 forming the fine structure 11 is $n_1$ and the refractive index of the matching layer 30 is $n_2$, $n_1$ and $n_2$ have the same or similar value within a predetermined error range.

The matching layer 30 is laminated above the film layer 10 on which the fine structure 11 is formed, and has the same refractive index as that of the film layer 10 forming the fine structure 11 within a predetermined error range. The matching layer 30 may be formed of at least one material selected from the group consisting of glass, PET, PC, PEN, co-PEN, PS, PMMA, PBT, PP, PE, and so forth.

One surface of the film layer 10 on which the fine structure 11 is formed may be in direct contact with the matching layer 30 and the other surface thereof may be applied with a pressure-sensitive adhesive. The pressure-sensitive adhesive may be formed of a silicon or acrylic-based pressure-sensitive adhesive composition and may be applied to the other surface of the film layer 10 on which the fine structure 11 is formed. However, the pressure-sensitive adhesive may also be formed to be integral with some material for forming the film layer 10 on which the fine structure 11 is formed. In addition, the pressure-sensitive adhesive may be in the form of a film of which both surfaces are applied with an adhesive to facilitate that the optical film is attached to the display.

The dot patterns 40 may be formed above the matching layer 30, and may be formed of an ink material that has a high transmittance of visible rays and can selectively absorb the infrared rays, or may be formed with a concentration that can minimize the effect on the display image while absorbing the infrared and visible rays. The infrared region is approximately in a range of 700 nm to 10,000 nm and may be divided into a near infrared region, a middle infrared region, and a far infrared region. The dot patterns 40 can absorb the near infrared region of about 750 nm to 1,300 nm.

For example, the dot patterns 40 may be formed by mixing a phthalocyanine-based compound, a naphthalocyanine-based compound, an aminium-based compound, or the like that has an infrared ray absorbing property with a resin having an infrared ray curable property and a hardener to generate a resin compound, and printing the resin compound onto the film layer 10 formed of the transparent material or the matching layer 30 described above.

In addition, the dot patterns 40 may be laminated above the matching layer 30 in the form of the dot pattern 40 layer, and the composition material and function thereof are already described.

The protection coating layer 50 may be formed on the dot patterns 40 or may be laminated above the dot pattern 40 layer to protect the dot patterns 40. The protection film may include a well-known general protection film, but it is preferable that the protection film be formed of a material that minimizes the display image distortion and does not deteriorate the visibility to meet the purposes of the present invention.

FIG. 4 is a configuration diagram illustrating an optical film in accordance with still another embodiment of the present invention.

The optical film according to still another embodiment of the present invention includes a matching layer 30 having a refractive index matching that of a film layer 10 forming a fine structure 11 within a predetermined error range, the film layer 10 laminated above the matching layer 30 and having the fine structure 11 formed on a lower surface of the film layer 10, a coating layer 20 formed on the lower surface of the film layer 10 and having an infrared ray scattering property, dot patterns 40 formed above the film layer 10, and a protection coating layer 50 for protecting the dot patterns 40.

The matching layer 30 has the same refractive index as that of the film layer 10 forming the fine structure 11 within a predetermined error range. The matching layer 30 may be formed of at least one material selected from the group consisting of glass, PET, PC, PEN, co-PEN, PS, PMMA, PBT, PP, PE, and so forth.

The upper surface of the matching layer 30 may be in direct contact with the film layer 10 on which the fine structure 11 is formed and the other surface thereof may be applied with a pressure-sensitive adhesive. The pressure-sensitive adhesive may be formed of a silicon or acrylic-based pressure-sensitive adhesive composition and may be applied to the other surface of the matching layer 30. However, the pressure-sensitive adhesive may also be formed to be integral with some material for forming the matching layer 30. In addition, the pressure-sensitive adhesive may be in the form of a film of which both surfaces are applied with an adhesive to facilitate that the optical film is attached to the display.

The film layer 10 may be formed of a transparent material that transmits rays incident on the optical film. For example, the film layer 10 may be formed of at least one material selected from the group consisting of glass, PET, PC, PEN, co-PEN, PS, PMMA, PBT, PP, PE, and so forth.

The film layer 10 may be laminated above the matching layer 30 and the fine structure 11 may be formed on the lower surface of the film layer. The fine structure 11 may be formed by structuring the lower surface of the film layer 10 or using a pressure-sensitive adhesive to laminate a separate structure such as a glass bead on the lower surface of the film layer 10. The fine structure 11 may be shaped to have any one of a semi-sphere shape, an inverted semi-sphere shape, a prism shape, and a triangular pyramid shape, or a similar type. The fine structure 11 may be formed to have a light-directing property. For example, the light-directing property of the fine structure 11 may include rotation, dispersion, refraction, or reflection.

The coating layer 20 having the same shape as that of the fine structure 11 may be formed on the fine structure 11. The coating layer 20 may be formed by cross-laminating transparent dielectric film regions to have an infrared ray reflecting function.

The transparent dielectric film may be formed of a material including at least one of oxides of zinc, tin, indium, bismuth, titanium, hafnium, and zirconium, alloys thereof, silicon nitride, and silicon oxynitride.

The coating layer 20 has the property that reflects or scatters the infrared rays of 800 nm to 1500 nm at a high ratio but transmits the visible rays because of the cross-lamination of the transparent dielectric film regions.

The refractive index of the film layer 10 forming the fine structure 11 and the refractive index of the matching layer 30 to be described hereinafter may be matched within a predetermined error range. Referring to FIG. 2, when the refractive index of the film layer 10 forming the fine structure 11 is $n_1$ and the refractive index of the matching layer 30 is $n_2$, $n_1$ and $n_2$ have the same or similar value within a predetermined error range.

The dot patterns 40 may be formed above the film layer 10, and may be formed of an ink material that has a high transmittance of visible rays and can selectively absorb the infrared rays, or may be formed with a concentration that can minimize the effect on the display image while absorbing the infrared and visible rays. The infrared region is approximately in a range of 700 nm to 10,000 nm and may be divided into a near infrared region, a middle infrared region, and a far infrared region. The dot patterns 40 can absorb the near infrared region of about 750 nm to 1,300 nm.

For example, the dot patterns 40 may be formed by mixing a phthalocyanine-based compound, a naphthalocyanine-based compound, an aminium-based compound, or the like that has an infrared ray absorbing property with a resin having an infrared ray curable property and a hardener to generate a resin compound, and printing the resin compound onto the film layer 10 formed of the transparent material or the matching layer 30 described above.

In addition, the dot patterns 40 may be laminated above the film layer 10 in the form of the dot pattern 40 layer, and the composition material and function thereof are already described.

The protection coating layer 50 may be formed on the dot patterns 40 or may be laminated above the dot pattern 40 layer to protect the dot patterns 40. The protection film may include a well-known general protection film, but it is preferable that the protection film be formed of a material that minimizes the display image distortion and does not deteriorate the visibility to meet the purpose of the present invention.

FIG. 5 is a configuration diagram illustrating an optical film in accordance with yet another embodiment of the present invention.

A fine structure 11 may be formed on a surface of a film layer 10. The fine structure 11 may be formed by structuring the surface of the film layer 10 along dot patterns 40. In addition, the fine structure 11 may be formed by using a pressure-sensitive adhesive to laminate a separate structure such as a glass bead partially structured along the dot patterns 40 on the surface of the film layer 10. The fine structure 11 may be shaped to have any one of a semi-sphere type, an inverted semi-sphere type, a prism shape, and a triangular pyramid shape, or a similar type. The fine structure 11 may be formed to have a light-directing property. For example, the light-directing property of the fine structure 11 may include rotation, dispersion, refraction, or reflection.

A coating layer 20 having the same shape as that of the fine structure 11 may be formed on the fine structure 11. The coating layer 20 may be formed by cross-laminating transparent dielectric film regions and may be partially formed on the surface of the film layer 10 along the fine structure 11.

FIG. 6 is a configuration diagram illustrating an optical film in accordance with still yet another embodiment of the present invention.

Referring to FIG. 6, as shown in FIG. 5, the fine structure 11 may be formed by partially structuring the surface of the film layer 10 along the dot patterns 40 or by using a pressure-sensitive adhesive to laminate a separate structure such as a glass bead partially structured along the dot patterns 40 on the surface of the film layer 10. However, the coating layer 20 is formed on the entire surface of the film layer 10, which is taken into consideration of problems such as manufacturing problems and accuracy.

FIG. 7 is a perspective diagram illustrating an optical film in accordance with still yet another embodiment of the present invention.

Referring to FIG. 7, it can be seen that the fine structure 11 is formed along the dot patterns 40 and the fine structures 11 are at dense intervals in comparison with the dot patterns 40.

FIG. 8 is a configuration diagram illustrating an optical film in accordance with still yet another embodiment of the present invention.

A fine structure 11 may be formed on an upper surface of a film layer 10. The fine structure 11 may partially structured along the surface of the film layer 10 on which marks 41 of the patterns 40 are not formed. In addition, the fine structure 11 may be formed by using a pressure-sensitive adhesive to laminate a separate structure such as a glass bead partially structured on the surface of the film layer 10 on which the marks 41 of the dot patterns 40 are not formed. The fine structure 11 may be shaped to have any one of a semi-sphere type, an inverted semi-sphere type, a prism shape, and a triangular pyramid shape, or a similar type. The fine structure 11 may be formed to be integral with the film layer 10 so as to have a light-directing property. For example, the light-directing property of the fine structure 11 may include rotation, dispersion, refraction, or reflection.

A coating layer 20 having the same shape as that of the fine structure 11 may be formed on the fine structure 11. The coating layer 20 may be formed by cross-laminating transparent dielectric film regions, and may be partially formed on the surface of the film layer 10 along the fine structure 11.

FIG. 9 is a configuration diagram illustrating an optical film in accordance with still yet another embodiment of the present invention.

Referring to FIG. 9, as shown in FIG. 8, the fine structure 11 may be formed by partially structuring the surface of the film layer 10 of which the marks 41 of the dot patterns 40 are not formed or by using a pressure-sensitive adhesive to laminate a separate structure such as a glass bead partially structured along the surface of the film layer 10 of which the marks 41 of the dot patterns 40 are not formed. However, the coating layer 20 is formed on the entire surface of the film layer 10, which is taken into consideration of problems such as manufacturing problems and accuracy.

FIG. 10 is a perspective diagram illustrating an optical film in accordance with still yet another embodiment of the present invention.

Referring to FIG. 10, it can be seen that the fine structure 11 is formed along the portion of which the marks 41 of the dot patterns 40 are not formed and the fine structures 11 are at dense intervals in comparison with the dot patterns 40.

FIG. 11 is a conceptual diagram illustrating a digital pen system in accordance with an embodiment of the present invention.

Referring to FIG. 11, the digital pen system according to an embodiment of the present invention includes a display 100, an optical film 200, and digital pen 300, wherein the optical film is laminated on the display 100 and includes a film layer 10 on which a fine structure 11 is formed, a coating layer 20 coated on the fine structure 11 and having an infrared ray scattering property, and a matching layer 30 laminated above or below the film layer 10 and having a refractive index matching that of the fine structure 11 within a predetermined error range, and has dot patterns 40 for absorbing the infrared rays printed on the fine structure 11 or the matching layer 30, and the digital pen 300 recognizes the dot patterns 40 and transmits signals for displaying graphical information on the display 100.

The display 100 may be a transmissive type display or a reflective type display. In a case of the transmissive type display, the digital pen 300 may sense the positional information of the dot patterns 40 using visible and infrared rays emitted from backlight units, or an infrared ray source (not shown) built in the digital pen 300 may be employed when the infrared rays are not emitted or rays for sensing the positional information are weak in the transmissive type display.

In a case of the reflective type display, since external lights are reflected toward the front direction from the display surface, information can be displayed externally without a backlight unit, and the digital pen 300 can sense the positional information using the reflected lights.

The digital pen 300 may be in the form of a general pen, and an infrared ray sensor (not shown) may be arranged in a portion in which a nib is formed. The infrared ray sensor may recognize the dot patterns 40 formed on the optical film 200. The digital pen 300 may obtain the pattern values in accordance with the dot patterns 40 recognized by the infrared ray sensor and obtain the positional information within the optical film 200.

FIG. 12 is a diagram illustrating dot patterns in accordance with an embodiment of the present invention, and FIG. 13 is a schematic diagram illustrating dot patterns in accordance with an embodiment of the present invention. The optical film 200 is disposed on the display 100, and has the dot patterns 40 for providing the positional information using reflected lights.

Referring to FIG. 12, the dot patterns 40 include virtual grating lines 42 and many marks 41, and each mark 41 may be formed at a constant interval on the basis of the intersection with the virtual grating line 42. Each mark 41 may provide the positional information by means of the pattern value determined in accordance with the position formed on the basis of the intersection with the virtual grating line 42. The mark 41 may be formed at a constant interval on the basis of the intersection with the virtual grating line 42 and may have a mark value, and the mark value may be a combination of at least two numbers different from each other. The mark 41 may have various shapes such as circles, ellipses, polygons, and straight lines, however, it is preferable that one kind of mark is used for one optical film.

For example, referring to FIG. 13, the mark 41 may be present at four positions in accordance with the relationship with the virtual grating line 42, wherein the mark value is "1" when the mark a is positioned at right of the intersection, "2" when the mark b is positioned at the upper side, "3" when the mark c is positioned at left of the intersection, and "4" when the mark d is positioned at the lower side of the intersection, so that the positional information may be provided in accordance with the position of the mark 41 on the basis of the intersection with the virtual grating line 42.

In addition, the mark 41 may be formed not on the virtual grating line 42 but diagonally and many marks may be formed on one virtual grating line 42 to provide the positional information. In this case, each mark value may be represented as arbitrary coordinates separated into x and y coordinates, and the positional information may be provided from the mark value represented as the coordinates.

The virtual grating lines 42 may be formed at constant intervals in horizontal and vertical directions. A distance between the virtual grating lines 42 may be 250 μm to 300 μm, and the mark 41 may be formed at a point with a one-fourth or one-eighth distance from the intersection with the virtual grating line 42. In addition, at least two marks 41 may be formed to be associated with each other with the intersection with the virtual grating line 42 as a center.

For example, when the infrared ray sensor recognizes thirty six marks 41 of 6 by 6 on the virtual grating lines 42 having a 6×6 size, the digital pen 300 may calculate the positional information according to each mark value, and may recognize the absolute position on the optical film 200 using the same.

Although an example in which the dot patterns 40 consisting of the virtual grating lines 42 and the marks 41 are recognized to calculate the positional information on the optical film 200 has been described in FIGS. 12 and 13, it is also possible to apply the optical film 200 of the present invention to all kinds of digital pen systems that can calculate the positional information using any patterns formed on the optical film 200.

A device for other communication means and a device capable of performing various functions such as a microphone and speaker may be built in the digital pen 300, and operations of the devices may be controlled by a microcontroller (MCU) built in the digital pen 300. In addition, an ink is included in the nib of the digital pen 300 to perform general functions of the general pen, and the optical film on which the information pattern is formed may be attached and used onto notes, boards, electronic bulletin boards that can reflect external lights and display information.

Although preferred embodiments of the present invention have been described, it will be understood by those skilled in the art that various modifications and changes can be made to the above-described exemplary embodiments of the present invention without departing from the spirit and scope of the claims below.

What is claimed is:

1. An optical film comprising:
   a film layer including fine structures having a light directing property;
   a coating layer coated on the fine structures and having an infrared ray scattering property;
   a matching layer laminated above or below the film layer and having a refractive index matching a refractive index of the film layer; and
   dot patterns printed on the film layer or the matching layer and configured to absorb infrared rays, wherein the dot patterns include virtual grating lines and marks providing positional information;
   wherein the fine structures and the coating layer are only formed in a portion in which the marks of the dot patterns are not formed,
   wherein the fine structures comprises glass beads partially laminated along a surface of the film layer of which the marks of the dot patterns are not formed, and
   wherein the fine structures are at dense intervals in comparison with the marks of the dot patterns.

2. The optical film of claim 1, wherein the coating layer comprises at least two material layers having different refractive indexes from each other, and the refractive index of the coating layer is determined by the refractive indexes of the at least two material layers.

3. The optical film of claim 1, wherein the coating layer has a function of reflecting infrared rays with a wavelength of 800 nm to 1,500 nm.

4. The optical film of claim 1, wherein one surfaces of the matching layer and the film layer are in contact with each other, and at least one other surface of the matching layer and the film layer is applied with a pressure-sensitive adhesive.

5. The optical film of claim 1, further comprising:
   a protection coating layer formed on the dot patterns and acting to protect the dot patterns.

6. The optical film of claim 1, wherein the fine structures have any one of a semi-sphere shape, an inverted semi-sphere shape, a prism shape, and a triangular pyramid shape.

* * * * *